United States Patent
Trofymov et al.

(10) Patent No.: US 11,656,620 B2
(45) Date of Patent: May 23, 2023

(54) GENERATING ENVIRONMENTAL PARAMETERS BASED ON SENSOR DATA USING MACHINE LEARNING

(71) Applicant: Luminar, LLC, Orlando, FL (US)

(72) Inventors: Dmytro Trofymov, Los Altos, CA (US); Pranav Maheshwari, Palo Alto, CA (US); Vahid R. Ramezani, Portola Valley, CA (US)

(73) Assignee: Luminar, LLC, Orlando, FL (US)

( * ) Notice: Subject to any disclaimer, the term of this patent is extended or adjusted under 35 U.S.C. 154(b) by 263 days.

(21) Appl. No.: 16/294,274

(22) Filed: Mar. 6, 2019

(65) Prior Publication Data

US 2020/0209858 A1 Jul. 2, 2020

Related U.S. Application Data (60) Provisional application No. 62/787,163, filed on Dec. 31, 2018.

(51) Int. Cl.
| | |
|---|---|
| *G05D 1/00* | (2006.01) |
| *G06N 20/00* | (2019.01) |
| *G06N 3/08* | (2023.01) |
| *G05D 1/02* | (2020.01) |
| *B60W 60/00* | (2020.01) |

(52) U.S. Cl.
CPC ........... *G05D 1/0088* (2013.01); *B60W 60/00* (2020.02); *G05D 1/0242* (2013.01); *G05D 1/0246* (2013.01); *G05D 1/0257* (2013.01); *G06N 3/08* (2013.01); *G06N 20/00* (2019.01); (Continued)

(58) Field of Classification Search
CPC ........ B64G 2001/247; B60K 2370/175; B60K 28/00; B60W 60/00; G05D 1/0088; G05D 1/0242; G05D 1/0246; G05D 1/0257; G05D 2201/0213; G06N 20/00; G06N 3/08; B60R 2300/103
See application file for complete search history.

(56) References Cited

U.S. PATENT DOCUMENTS

| | | | | |
|---|---|---|---|---|
| 2017/0109458 | A1* | 4/2017 | Micks | G09B 9/042 |
| 2017/0132334 | A1* | 5/2017 | Levinson | G06F 30/20 |

(Continued)

OTHER PUBLICATIONS

Bojarski et al., "End to End Learning for Self-Driving Cars," arXiv:1604.07316v1 [cs.CV] (Apr. 25, 2016).

*Primary Examiner* — Ig T An
(74) *Attorney, Agent, or Firm* — Van Pelt, Yi & James LLP (57) ABSTRACT

To generate a machine learning model for controlling autonomous vehicles, training sensor data is obtained from sensors associated with one or more vehicles, the sensor data indicative of physical conditions of an environment in which the one or more vehicles operate, and a machine learning (ML) model is trained using the training sensor data. The ML model generates parameters of the environment in response to input sensor data. A controller in an autonomous vehicle receives sensor data from one or more sensors operating in the autonomous vehicle, applies the received sensor data to the ML model to obtain parameters of an environment in which the autonomous vehicle operates, provides the generated parameters to a motion planner component to generate decisions for controlling the autonomous vehicle, and causes the autonomous vehicle to maneuver in accordance with the generated decisions.

20 Claims, 8 Drawing Sheets

(52) U.S. Cl.
   CPC .............. *B60K 2370/175* (2019.05); *G05D 2201/0213* (2013.01)

(56) References Cited

U.S. PATENT DOCUMENTS

| | | | |
|---|---|---|---|
| 2017/0278303 A1* | 9/2017 | Groh | G06T 15/205 |
| 2019/0243371 A1* | 8/2019 | Nister | G05D 1/0231 |
| 2019/0303759 A1* | 10/2019 | Farabet | G06N 3/063 |
| 2019/0384304 A1* | 12/2019 | Towal | G05D 1/0221 |
| 2019/0392242 A1* | 12/2019 | Tariq | G06F 18/2413 |
| 2020/0074266 A1* | 3/2020 | Peake | G05D 1/0231 |
| 2020/0160598 A1* | 5/2020 | Manivasagam | G07C 5/02 |

\* cited by examiner

GENERATING ENVIRONMENTAL PARAMETERS BASED ON SENSOR DATA USING MACHINE LEARNING

CROSS-REFERENCE TO RELATED APPLICATIONS

This application claims priority to provisional U.S. application Ser. No. 62/787,163, filed on Dec. 31, 2018, entitled "Generating Environmental Parameters Based on Sensor Data Using Machine Learning," the entire disclosure of which is hereby expressly incorporated by reference herein.

FIELD OF TECHNOLOGY

The present disclosure generally relates to autonomous vehicles, and, more particularly, to developing and applying a machine learning model to generate parameters of an environment in which an autonomous vehicle operates.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices, cameras, radars, etc. to detect or "see" the surrounding environment as the vehicles move toward their destinations. Such vehicles include self-driving control systems that process the sensor data and, based on both the sensed environment and the desired destination, determine which maneuvers and operational states (e.g., braking force, steering direction) are most appropriate on a more or less continuous basis throughout the trip. Accomplishing this task can be extremely challenging, due in large part to the virtually infinite number of different scenarios that such vehicles may encounter, as well as stringent safety requirements with respect to both the autonomous vehicle passengers and any individuals who may be in the general vicinity of the autonomous vehicles.

Some approaches include extracting road parameters such as road curvature information, road boundaries, lane boundaries, etc. separately from sensors and/or from maps and then fusing these parameters together to form so-called "semantic maps." For example, a computing system can use the output of an inertial measurement unit (IMU) of a vehicle, collected over a certain period of time, to approximately determine curvature of a certain segment of a road. The computing system similarly can use the output of the IMU, or output of a dedicated vibration sensor, to estimate road quality. However, this and similar approaches require a complex combination of multiple methods and techniques. The example above for instance requires one algorithm for determining curvature and another, unrelated algorithm for estimating road quality. Moreover, because road information components have a high degree of dependency, determining these components separately may reduce accuracy.

Further, according to some approaches, controllers of autonomous vehicles process sensor input procedurally, i.e., by performing particular pre-programed operations in response to particular sensor inputs. However, because it is difficult to account for the large number of situations an autonomous vehicle can encounter during operation, other approaches are based on machine-learning techniques, which generally allow correlations, or other associations, to be defined between training datasets and labels.

More particularly, it has been proposed to implement end-to-end learning for autonomous vehicles, where a machine learning model generates decisions for controlling an autonomous vehicle based on various combinations of sensor inputs. Thus, for example, the machine learning model can output parameters of a certain maneuver, such as the direction and speed of movement, for a certain set of sensor inputs. Although systems that implement such techniques generally demonstrate good performance, these techniques are not verifiable and risky to be used alone in self-driving applications.

SUMMARY

As described in herein, a vehicle controller of this disclosure determines multiple road parameters concurrently in real time using one or more sensor inputs. To this end, the vehicle controller can use a machine learning (ML) model that receives real-time data from sensor(s) as input and provides parameters of the environment, such as road parameters and distances to objects on the road, as an output. The vehicle controller then can apply the output of the machine learning model to a motion planning component to generate decisions for controlling the autonomous vehicle.

A computing platform can train the machine learning model using sensor input from one or more vehicles. The computing platform in various implementations can use sensor data from a real-world environment, a virtual environment, or both. Further, the computing platform in some implementations can use map data as ground truth data during training. Still further, the computing platform can use additional data, such as indications of whether traffic lights are located in a particular geographic area, as an additional constraint.

Thus, rather than implementing end-to-end learning for autonomous vehicles, the training platform of this disclosure can implement end-to-end tuning of perception. These techniques generally reduce complexity of controlling an autonomous vehicle. Further, by training a model that accounts for combinations of various inputs, these techniques efficiently utilize cross-information and cross-sensor dependencies. Still further, these techniques improve the verifiability of certain safety-critical features, such as the ability to accurately identify lane markings.

One example embodiment of these techniques is a method for generating a machine learning model for controlling autonomous vehicle. The method includes obtaining, by processing hardware, training sensor data from multiple sensors associated with one or more vehicles. The sensor data is indicative of physical conditions of an environment in which the one or more vehicles operate. The method further includes training, by the processing hardware, a machine learning (ML) model using the training sensor data, such that the ML model generates parameters of the environment in response to input sensor data. A controller in an autonomous vehicle receives sensor data from one or more sensors operating in the autonomous vehicle, applies the received sensor data to the ML model to obtain parameters of an environment in which the autonomous vehicle operates, provides the generated parameters to a motion planner component to generate decisions for controlling the autonomous vehicle, and causes the autonomous vehicle to maneuver in accordance with the generated decisions.

Another example embodiment of these techniques is a computing system comprising processing hardware and a non-transitory computer-readable memory storing instructions. When executed by the processing hardware, the instructions cause the computing system to obtain training sensor data from a plurality of sensors associated with one or more vehicles, the sensor data indicative of physical conditions of an environment in which the one or more vehicles operate; and train an ML model using the training sensor data, the ML model generating parameters of the environment in response to input sensor data. A controller in an autonomous vehicle receives sensor data from one or more sensors operating in the autonomous vehicle, applies the received sensor data to the ML model to obtain parameters of an environment in which the autonomous vehicle operates, provides the generated parameters to a motion planner component to generate decisions for controlling the autonomous vehicle, and causes the autonomous vehicle to maneuver in accordance with the generated decisions.

Yet another example embodiment of these techniques a controller operating in an autonomous vehicle. The controller comprises one or more processing units and a non-transitory computer-readable memory. The memory stores an ML model configured to generate parameters of an environment in which the autonomous vehicle operates, in response to input sensor data, first instructions that implement a perception module configured to (i) receive sensor data from one or more sensors operating in the autonomous vehicle, in real time, and (ii) apply the sensor data to the ML model to generate parameters of an environment in which the autonomous vehicle operates, and second instructions that implement a motion planner configured to (i) receive the generated parameters from the perception module, and (ii) generate decisions for controlling the autonomous vehicle based on the generated parameters. The controller causes the autonomous vehicle to maneuver in accordance with the generated decisions.

Still another embodiment of these techniques is an autonomous vehicle comprising vehicle maneuvering components to effectuate at least steering, acceleration, and braking of the autonomous vehicle, one or more sensors configured to generate signals indicative of physical conditions of an environment in which the autonomous vehicle operates, and a controller configured to (i) receive the signals from the one or more sensors, (ii) apply the received signals to an ML model to generate, in real time, parameters of an environment in which the autonomous vehicle operates, (iii) apply the generated parameters of the environment to a motion planner to generate decisions for controlling the autonomous vehicle, and (iv) control the vehicle maneuvering components in accordance with the generated decisions.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

As discussed below, a training platform of this disclosure is configured to train a machine learning (ML) model that generates parameters of an environment, using real-world and/or virtual reality data corresponding to sensor input (e.g., lidar data, camera data, IMU data). A controller in an autonomous vehicle then can use the machine learning model to generate parameters of the environment in which the autonomous vehicle operates based on real-time sensor data, and apply the parameters of the environment to a motion planner. The controller thus obtains parameters of the environment separately from, and independently of, decisions for controlling the vehicle.

Figure 1:
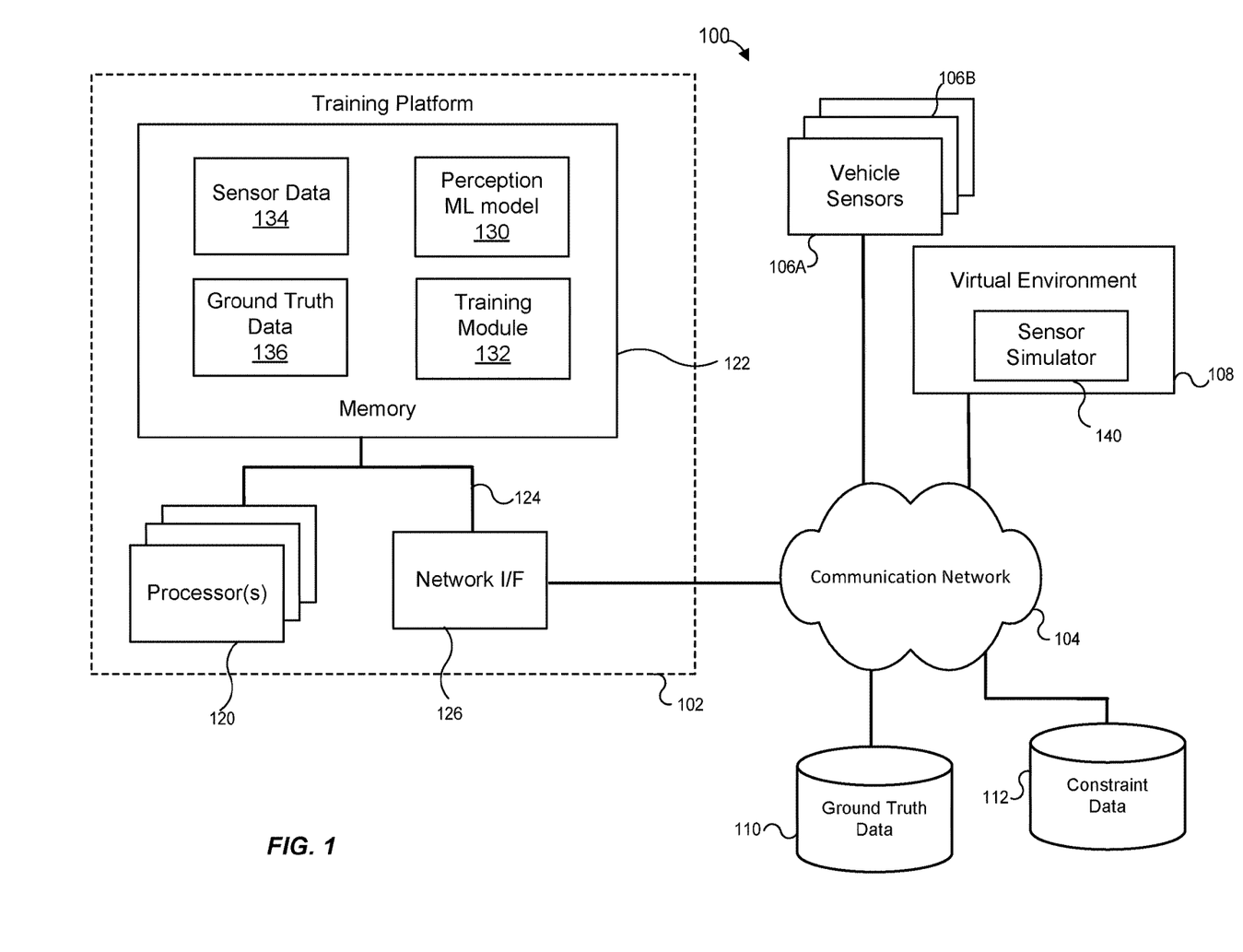
FIG. 1 is a block diagram of an example computing environment in which a training module can operate to train a perception machine learning model for generating parameters of an environment based on sensor data in an autonomous vehicle.

FIG. 1 illustrates an example computing environment 100 in which a training platform 102 can operate. The training platform 102 can receive, via a communication network 104, data from real-world sensors 106 and/or virtual sensors operating in a virtual environment 108. The training platform 102 in some cases also receives ground truth data 110 and additional constraint data 112, to be used in machine model training. The training platform 102 can be implemented in one or more servers, which can be any suitable computing devices. In some implementations, the training platform 102 operates in a "cloud" network.

The training platform 102 can include one or more processor(s) 120 as well a computer-readable memory 122, which could comprise one or more computer memories, memory chips, etc. The memory 122 can include one or more forms of volatile and/or non-volatile, fixed and/or removable, memory. Examples of suitable memory components include read-only memory (ROM), electronic programmable read-only memory (EPROM), random access memory (RAM), erasable electronic programmable read-only memory (EEPROM), and/or other hard drives, flash memory, and MicroSD cards. The memory 122 may store an operating system (OS) (e.g., Microsoft Windows, Linux, Unix, etc.) capable of supporting the functionality of the training module 132 discussed below. The processor(s) 120 may be connected to memory 122 via a computer bus 124 responsible for transmitting electronic data, data packets, or other electronic signals to and from the processor(s) 120 and the memory 122.

The training platform 102 also can include a network interface 126 configured to communicate (e.g., send and receive) data via the communication network 104. The network interface 126 can include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports.

Further, the training platform 102 can include or implement I/O connections that interface with I/O device(s) configured to present information to an administrator or operator and/or receive inputs from the administrator or operator (not shown to avoid clutter). For example, an operator interface may include a display screen. I/O devices may include touch sensitive input panels, keys, keyboards, buttons, lights, LEDs, which may be accessible via graphics platform 101. According to some embodiments, an administrator or operator may access the training platform 102 via appropriate I/O device(s) to input training data, review the training data, view various parameters of the machine learning model discussed below, etc.

As illustrated in FIG. 1, the memory 122 can store a perception machine learning model 130 (for simplicity, "the perception model 130") and instructions that implement a training module 132. In operation, the training module 132 uses sensor data 134 and, in some implementations, ground truth data 136 to train the perception model 130, which then can be deployed in an autonomous vehicle, as discussed in more detail below. The sensor data 134 can include data collected in the real (physical) world and/or one or more virtual environments. In particular, the sensor data 134 can include data received from the real-world vehicle sensors 106 and/or virtual sensors operating in the virtual environment 108.

The real-world vehicle sensors 106 can include lidars, cameras (e.g., charge-coupled device (CCD) or complementary metal-oxide semiconductor (CMOS) cameras), IMU units, positioning units, etc. The vehicle sensors 106 can supply the sensor data 134 in any suitable format, such as a 3D point cloud, still images, video feeds, etc. In general, any number of vehicles, each equipped with one or multiple sensors, can provide data to the training platform 102. Moreover, the vehicles need not have the same configuration, and thus one vehicle can report its lidar and camera data, another vehicle can reports its IMU data, etc.

Additionally or alternatively, the virtual environment 108 can supply simulated sensor data to the training platform 102. The virtual environment 108 can be implemented in one or more server devices equipped with processing hardware, computer-readable memory, etc. The data used to construct the virtual environment 108 can include photorealistic scenes (e.g., simulated 2D image data), depth-map realistic scenes (e.g., simulated 3D image data), and/or environment-object data (e.g., simulated data defining how objects or surfaces interact), each corresponding to the same virtual environment. For example, the environment-object data for a particular vehicle in the virtual environment may relate to the vehicle's motion (e.g., position, velocity, acceleration, trajectory, etc.). Interactions between objects or surfaces within the virtual environment 108 affect the data outputted for the simulated environment, e.g., rough roads or potholes affect measurements of a virtual inertial measurement unit (IMU) of a vehicle. Environment-object data for example could include data regarding geometry or physics related to a vehicle striking a pothole in a virtual environment. More generally, environment-object data can refer to information about objects/surfaces within a virtual environment, e.g., interactions between objects or surfaces in the virtual environment and how those interactions effect the objects or surfaces in the virtual environment, e.g., a vehicle hitting a pothole. Further, environment-object data may describe certain properties of objects, such as hardness, shape/profile, roughness, etc. Still further, environment-object data may define how objects or surfaces interact when such objects or surfaces interact with each other within the virtual environment 108 (e.g., data indicating shock to a virtual vehicle when it strikes a virtual pothole, etc.).

The virtual environment 108 may be at least partially generated based on geo-spatial data. Such geo-spatial data may be sourced from predefined or existing images or other geo-spatial data (e.g., height maps or geo-spatial semantic data such as road versus terrain versus building data) as retrieved from remote sources (e.g., Mapbox images, Google Maps images, etc.). For example, the geo-spatial data may be used as a starting point to construct detailed representations of roads, lanes for the roads, and/or other objects or surfaces within the virtual environment. If previously collected image or depth data is available for a particular region of the virtual environment, then the system also can use real-world lidar data, and/or use techniques such as simultaneous localization and mapping (SLAM) or photogrammetry to construct the virtual environment to provide additional real-world detail not specified by the map-based geo-spatial data.

In some implementations, generative machine learning models, such as generative adversarial networks (GANs), may be used to dynamically generate objects, surfaces, or scenarios within the virtual environment 108, including, for example, dynamically generated signs, obstacles, intersections, etc. In other embodiments, standard procedural generation ("proc gen") may also be used.

A sensor simulator 140 may generate simulated sensor data and supply this data to the training platform 102 to be used as the sensor data 134, or as a portion of the sensor data 134. More particularly, the virtual environment 108 can include virtual sensors that generate data indicative of conditions of the virtual environment 108. These virtual sensors can be mounted on the virtual vehicles operating in the virtual environment 108. The placement and orientation of the virtual sensors can correspond to the placement and orientation of similar sensors used with real-world sensors.

For example, one or more virtual lidar sensors may be placed in various positions around one or more virtual vehicles in the virtual environment 108 for the purpose of generating simulated lidar sensor data. The sensor simulator 140 accordingly may simulate lidar (e.g., light detection and ranging) readings using ray casting or depth maps. Further, one or more virtual CMOS, CCD, or similar cameras may be placed in various positions around one or more virtual vehicles, and the sensor simulator 140 can simulate photographs of the virtual environment 108. Still further, one or more virtual thermal cameras may be placed in various positions around one or more virtual vehicles to generate reflectivity values for the purpose of simulating thermal camera readings. In general, the sensor simulator 140 can simulate any number of sensors of various types, e.g., IMU units, GPS sensors, and temperature sensors.

Figure 2A:
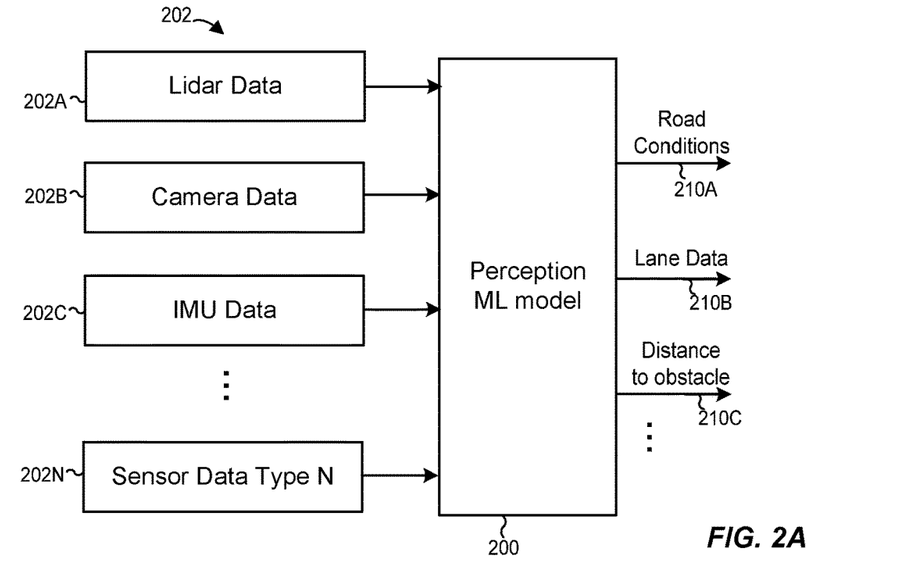
FIG. 2A is a block diagram of an example perception machine learning model that can be trained in the computing environment of FIG. 1.

Next, FIG. 2A depicts an example perception machine learning model 200 that the training platform 102 of FIG. 1 can train, and that an autonomous vehicle (see, e.g., FIG. 3 below) can apply during operation to generate real-time parameters of the environment. The perception machine learning model 200 thus can be utilized as the perception model 130. The machine learning model 200 in general can be of any suitable type, e.g., a convolutional neural network (CNN). For example, a CNN may be particularly well-suited for classification of objects such as lane dividers, stop signs, traffic lights, etc., and long short-term memory (LSTM) implementing a recurrent neural network (RNN) can be particularly useful in tracking moving objects such as cars and pedestrians. In some implementations, the machine learning model 200 includes multiple component models, each of which can be trained separately.

The machine learning model 200 can receive sensor data 202 of various types. For example, sensor data 202 can include lidar data 202A, camera data 202B, IMU data 202C, etc. As discussed above, the sensor data 202 can include data from real-world sensors, virtual sensors, or both. The machine learning model 200 can output road conditions 210A, lane data 210B, and distance to obstacle data 210C. In some implementations, the machine learning model 200 also generates confidence scores for some or all of the outputs 210A-C. Generally speaking, the confidence scores can depend on the amount of training, the degree to which the inputs 202A-N are in agreement (e.g., the degree to which camera data 202B, if considered alone, predicts the same parameters as the lidar data 202A, if considered alone), the intrinsic accuracy of the sensors used to generate the inputs 202A-N, etc.

Referring back to FIG. 1, the training platform 102 can train the machine learning model 200 to determine which combinations of sensor inputs correspond to which features of the environment. More specifically, the training platform 102 can use sets of real or simulated sensor data that have been labeled according to "correct" outputs, e.g., indications of road conditions corresponding to the sensor data, lane geometry, lane type, distance to obstacle, etc. By way of this training, the machine learning model 200 can learn to recognize environmental parameters for various combinations of sensor data. The training platform 102 additionally or alternatively can train the machine learning model 200 using other techniques, such as by using supervised learning with labels which human operators can enter via I/O devices of the training platform 102.

In some implementations, the training platform 102 is configured to process sensor data corresponding to different sensor parameter settings (e.g., different scan line distributions, different exposure settings, etc.). Thus, when implemented in an autonomous vehicle, the machine learning model 200 can generate outputs 210A, 210B, 210C, etc. in response to real-time sensor data generated by differently configured sensors, and/or data generated by a single sensor that is configured differently at different times.

In one implementation, the training of the machine learning model 200 is conditioned on the specific sensor parameter setting that corresponds to each different set of (real or simulated) sensor data. That is, the training data may include not only various sets of real-world and/or virtual sensor data, but also indications of which sets of sensor data correspond to which sensor parameter settings. Alternatively, a different portion of the machine learning model 200 (e.g., a neural network) may be separately trained for each parameter setting of interest. As a more specific example, the training platform 102 can train a first neural network to handle a first scan line distribution, a second neural network trained to handle a second scan line distribution, etc. In either case, the machine learning model 200 can operate in an autonomous vehicle by receiving as inputs not only sensor data but also indications of the current sensor parameter setting.

Figure 2B:
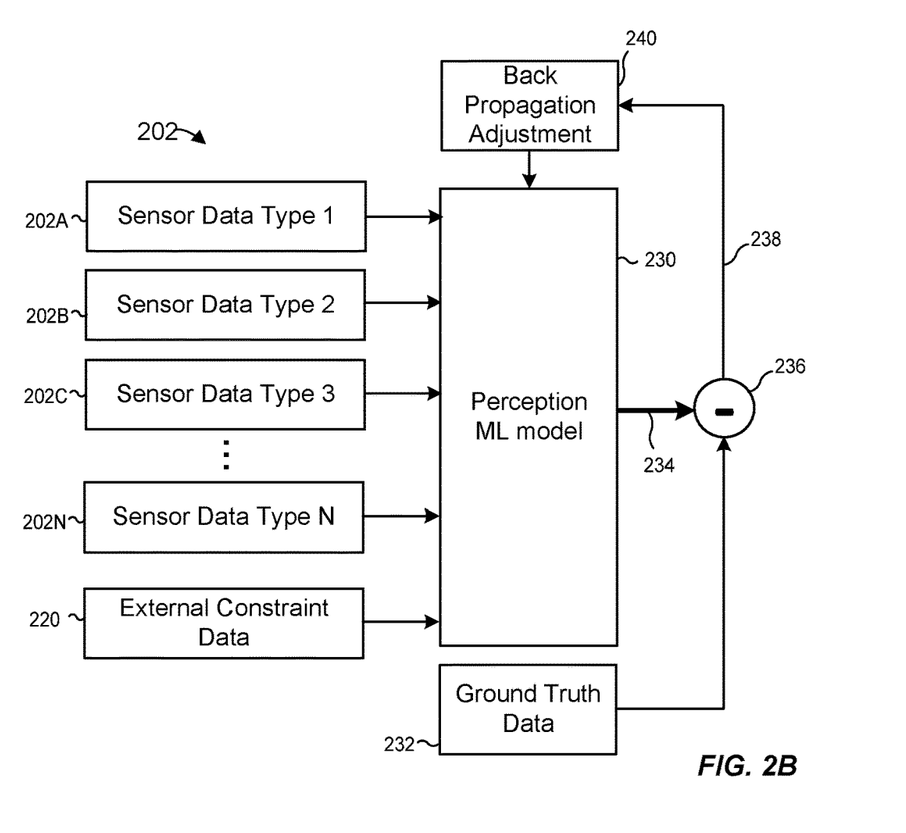
FIG. 2B is a block diagram of another example perception machine learning model that can be trained in the computing environment of FIG. 1.

FIG. 2B depicts another example perception machine learning model 230 that the training platform 102 of FIG. 1 can train and autonomous vehicle use during operation. Similar to the perception machine learning model 200, the perception machine learning model 230 can operate as the perception model 130.

Also similar to the machine learning model 200, the model 230 receives sensor inputs 202 such as lidar data 202A, cameras data 202B, IMU data 202C, etc. However, the model 230 also receives external constraint data 220 (e.g., indications of whether traffic lights are located in a particular geographic area) and ground truth data 232. A comparator 236 can receive the ground truth data 232 along with the output 234 of the perception machine learning model 230, generate an error signal 238, and provide the error signal to the 238 to a back propagation adjustment module 240, which provides additional input to the model 230. In an example implementation, the ground truth data 232 is map data that describes some of the same parameters of the environment described by the outputs 234, e.g., road geometry at a certain location.

Figure 3:
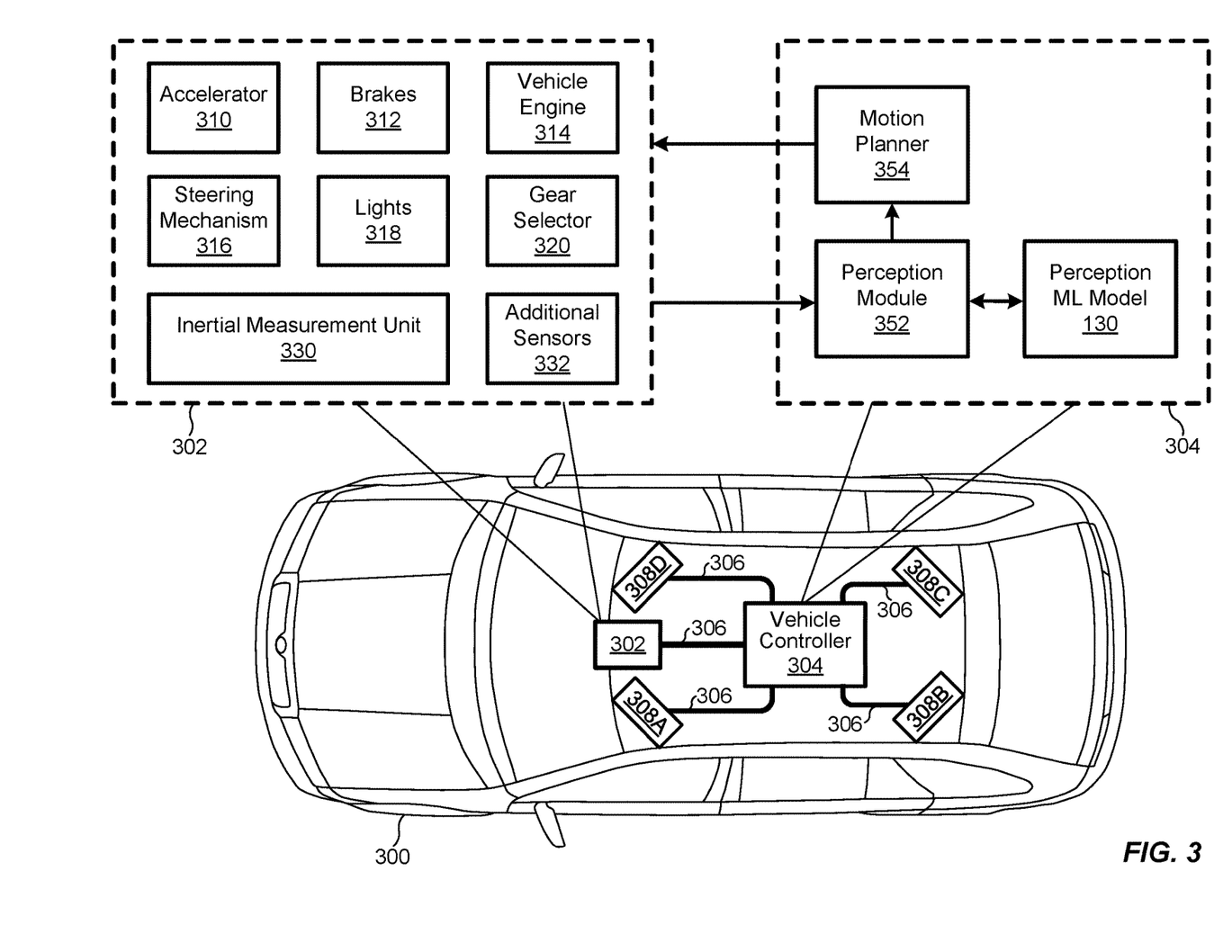
FIG. 3 illustrates an example autonomous vehicle in which a controller can utilize the perception machine learning model of FIG. 2A or 2B.

FIG. 3 illustrates an example autonomous vehicle 300 in which a controller 304 can utilize the perception machine learning model of FIG. 2A or 2B to operate various components 302 for maneuvering and otherwise control operation of the vehicle 300. These components are depicted in an expanded view in FIG. 3 for clarity. The components 302 can include an accelerator 310, brakes 312, a vehicle engine 314, a steering mechanism 316, lights 318 such as brake lights, head lights, reverse lights, emergency lights, etc., a gear selector 320, and/or other suitable components that effectuate and control movement of the vehicle 300. The gear selector 320 may include the park, reverse, neutral, drive gears, etc. Each of the components 302 may include an interface via which the component receives commands from the vehicle controller 304 such as "increase speed," "decrease speed," "turn left 5 degrees," "activate left turn signal," etc. and, in some cases, provides feedback to the vehicle controller 304.

The autonomous vehicle 300 can be equipped with a lidar that includes multiple sensor heads 308A-D coupled to the vehicle controller 304 via sensor links 306. Each of the sensor heads 308 may include a light source and a receiver, for example, and each of the sensor links 306 may include one or more optical links and/or one or more electrical links and/or one or more wireless links. The sensor heads 308 in FIG. 3 are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 308 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 3, four lidar sensor heads 308 are positioned at or near the four corners of the roof of the vehicle, and the vehicle controller 304 may be located within the vehicle 300 (e.g., in or near the roof or trunk). The four sensor heads 308 may each provide a 90° to 120° horizontal field of regard (FOR), and the four sensor heads 308 may be oriented so that together they provide a complete 360-degree view around the vehicle. As another example, the lidar system may include six sensor heads 308 positioned on or around the vehicle 300, where each of the sensor heads 308 provides a 60° to 90° horizontal FOR. As another example, the lidar system may include eight sensor heads 308, and each of the sensor heads 308 may provide a 45° to 60° horizontal FOR. As yet another example, the lidar system may include six sensor heads 308, where each of the sensor heads 308 provides a 70° horizontal FOR with an overlap between adjacent 308 of approximately 10°. As another example, the lidar system may include two sensor heads 308 which together provide a forward-facing horizontal FOR of greater than or equal to 30°.

Data from each of the sensor heads 308 may be combined or stitched together to generate a point cloud that covers a greater than or equal to 30-degree horizontal view around a vehicle. For example, the lidar system may include a controller or processor that receives data from each of the sensor heads 308 (e.g., via a corresponding electrical link 306) and processes the received data to construct a point cloud covering a 360-degree horizontal view around a vehicle or to determine distances to one or more targets. The point cloud or information from the point cloud may be provided to a vehicle controller 304 via a corresponding electrical, optical, or wireless link 306. The vehicle controller 304 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 308 at a controller included within the lidar system, and is provided to the vehicle controller 304. In other implementations, each of the sensor heads 308 includes a controller or processor that constructs a point cloud for a portion of the 360-degree horizontal view around the vehicle and provides the respective point cloud to the vehicle controller 304. The vehicle controller 304 then combines or stitches together the point clouds from the respective sensor heads 308 to construct a combined point cloud covering a 360-degree horizontal view. Still further, the vehicle controller 304 in some implementations communicates with a remote server to process point cloud data.

In some implementations, the vehicle controller 304 receives point cloud data from the sensor heads 308 via the links 306 and analyzes the received point cloud data, using any one or more of the aggregate or individual SDCAs disclosed herein, to sense or identify targets and their respective locations, distances, speeds, shapes, sizes, type of target (e.g., vehicle, human, tree, animal), etc. The vehicle controller 304 then provides control signals via the links 306 to the components 302 to control operation of the vehicle based on the analyzed information.

In addition to the lidar system, the vehicle 300 may also be equipped with an IMU 330 and other sensors 332 such as a camera, a thermal imager, a conventional radar (none illustrated to avoid clutter), etc. The sensors 330 and 332 can provide additional data to the vehicle controller 304 via wired or wireless communication links. Further, the vehicle 300 in an example implementation includes a microphone array operating as a part of an acoustic source localization system configured to determine sources of sounds.

As illustrated in FIG. 3, the vehicle controller 304 can include a perception module 352 and a motion planner 354, each of which can be implemented using hardware, firmware, software, or any suitable combination of hardware, firmware, and software. In operation, the perception module 352 can receive sensor data from the sensors 330, 332, 308A-D, etc. and apply the received sensor data to the perception model 130 to generate parameters of the environment in which the autonomous vehicle 300 operates, such as curvature of the road, presence of obstacles, distance to obstacles, etc. The perception module 352 then can supply these generated parameters to the motion planner 354, which in turn generates decision for controlling the autonomous vehicle 300 and provides corresponding commands to the accelerator 310, the brakes 312, the vehicle engine 314, the steering mechanism 316, etc.

The motion planner 354 may utilize any suitable type(s) of rules, algorithms, heuristic models, machine learning models, or other suitable techniques to make driving decisions based on the output of the perception module 352, which utilizes the perception model 130 as discussed above. For example, in some implementations, the motion planner 354 is configured with corresponding algorithms to make particular decisions for controlling the autonomous vehicle 300 in response to specific signals or combination of signals. As another example, in some embodiments, a machine learning model for the motion planner 354 may be trained using descriptions of environmental parameters of the type the perception model 130 generates. In additional embodiments, virtual data may be used to train a machine learning model of motion planner 354. For example, the motion planner 354 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In any case, the training platform 102 can train the motion planning model separately and independently of the perception module 352.

Figure 4:
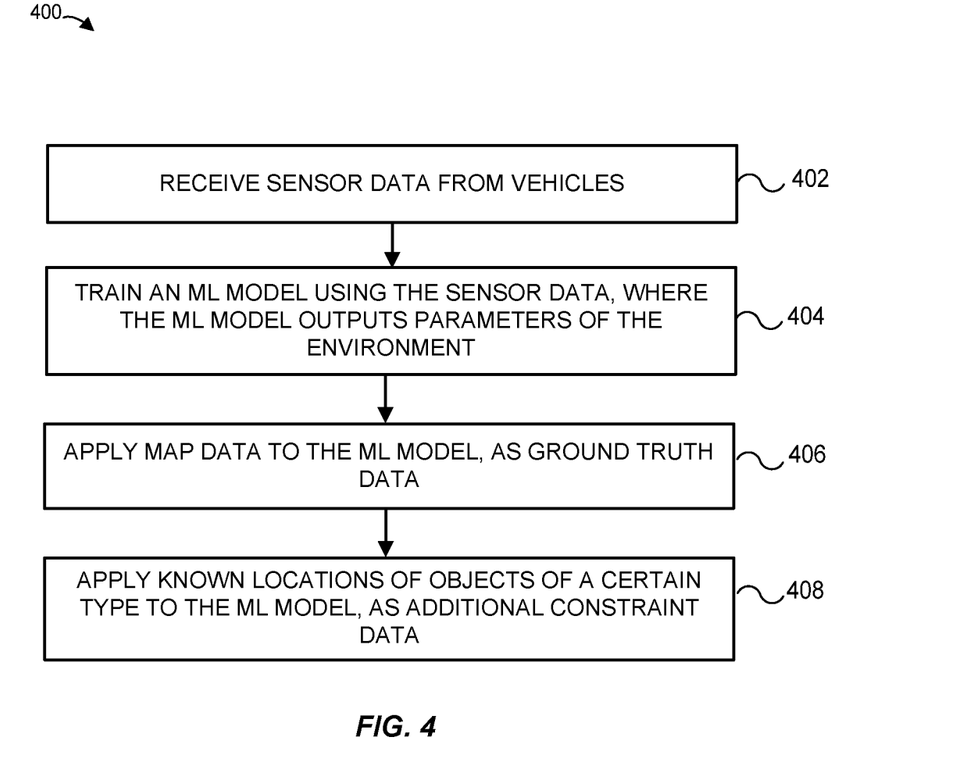
FIG. 4 is a flow diagram of an example method for training a perception machine learning model, which can be implemented in the computing environment of FIG. 1.

Next, FIG. 4 illustrates an example method 400 for training a perception machine learning model. For ease of illustration, the method 400 is discussed below with reference to the training module 132, but in general the method 400 can be implemented on any suitable computing platform, in one or multiple devices.

The method 400 begins at block 402, where the training module 132 receives sensor data from vehicles. The sensor data can correspond to real-world data and/or simulated data. For example, the training module 132 can receive data from the sensors 106 as well as the sensor simulator 140 operating the virtual environment 108. The sensor data can conform to any suitable format can come from a variety of sources. For example, data from one or more lidar sensor heads can include 3D point clouds, data from one or more CMOS cameras can include 2D images, data from an IMU can include indications of speed, etc.

At block 404, the training module 132 trains a machine learning model using the sensor data obtained at block 402. As discussed above with reference to FIGS. 2A and 2B, the training module 132 can provide to the model various sensor inputs along with indications of parameters of the real-world or virtual environment in which the vehicle operated when the corresponding sensor data was collected.

Next, at block 406, the training module 132 applies map data as ground truth data to the model. As discussed with reference to FIG. 2B, the ground truth data can be used to more efficiently train the machine learning model by generating back propagation adjustment. At block 408, the training module 132 then applies known locations of objects of a certain type to the machine learning model, as additional constraint data. In an example scenario, the training module 132 can receive a listing of locations of traffic lights in a certain geographic area, e.g., a certain municipality, county, state, etc. The training module 132 can apply this additional data as an additional input when training the machine learning model. In one implementation, the locations of traffic lights represent high probability of traffic lights being present at certain locations, and can be used as a corresponding cost function.

In some implementations, the training module 132 can combine data from real-world and virtual-world sources to improve the efficiency and/or safety of training the perception model 130. For example, the training module 132 can train the perception model 130 using real-world sensor data collected in the absence of other cars, and further train the perception model 130 using data from the virtual environment 108 to train the perception model 130 to recognize and track cars.

Figure 5:
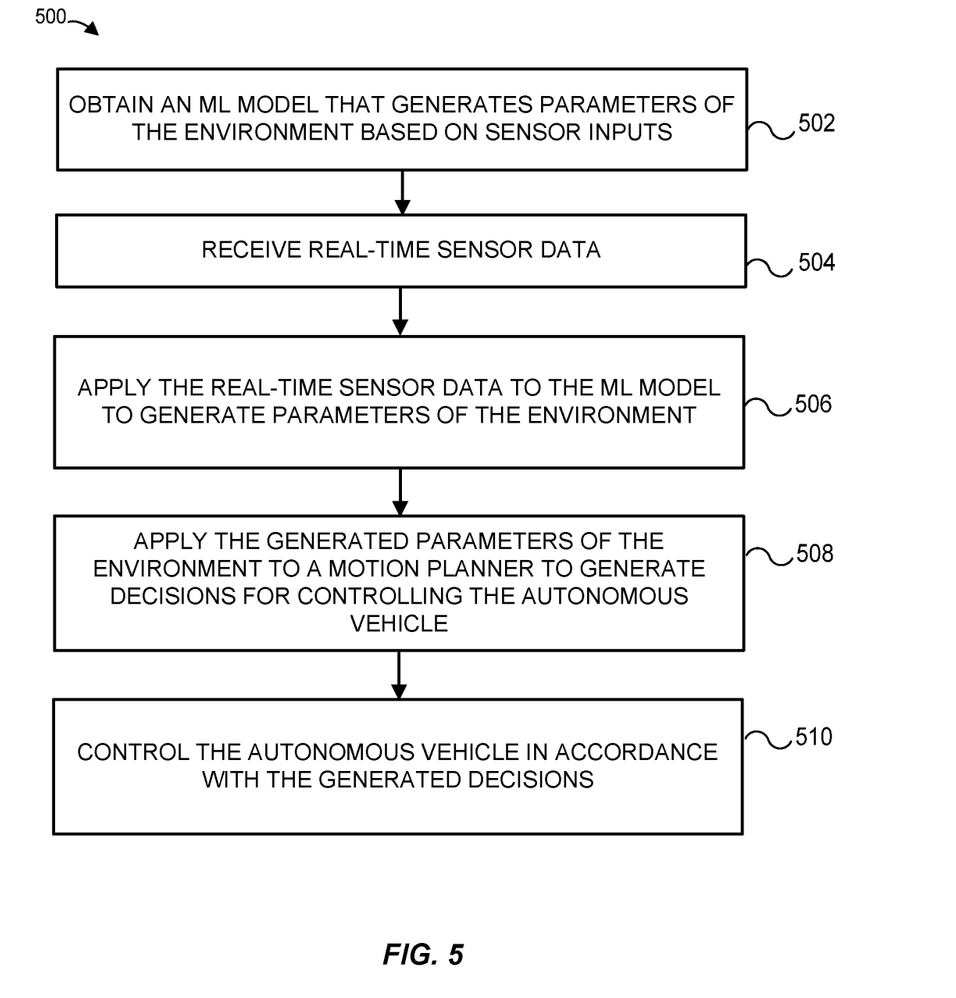
FIG. 5 is a flow diagram of an example method for applying a perception machine learning model, which can be implemented in the autonomous vehicle of FIG. 3.

FIG. 5 illustrates an example method 500 for applying a perception machine learning model. The method 500 is discussed below with reference to the vehicle controller 304, but in other implementations the method 500 can be implemented in any suitable autonomous vehicle.

At block 502, the vehicle controller 304 obtains a machine learning model that generates parameters of the environment in response to input sensor data. The vehicle controller 304 then receives real-time sensor data at block 504. In general, the types of signals included in the real-time sensor data can correspond to any suitable subset of the types of sensor data used to train the perception model.

Next, at block 506, the vehicle controller 304 applies the real-time data to the machine-learning model to generate parameters of the environment. The parameters of the environment can correspond to road geometry (e.g., where the road boundaries are), lane markings and designations (e.g., carpool only, left turn only), the location and types of road signs, the location of status of traffic lights, the location of bridges, indications of whether the road is paved or unpaved, the locations of potholes or debris. Further, the parameters of the environment can include objects on the road, including moving objects such as other vehicles, pedestrians, bicyclists, etc. The vehicle controller 304 in some cases also generates confidence scores for the predictions.

Then, at block 508, the vehicle controller 304 applies these parameters (and, when available, the confidence scores) to a motion planner to generate decisions for controlling an autonomous vehicle. At block 510, the vehicle controller 304 controls the autonomous vehicle in accordance with the generated decisions.

Figure 6A:
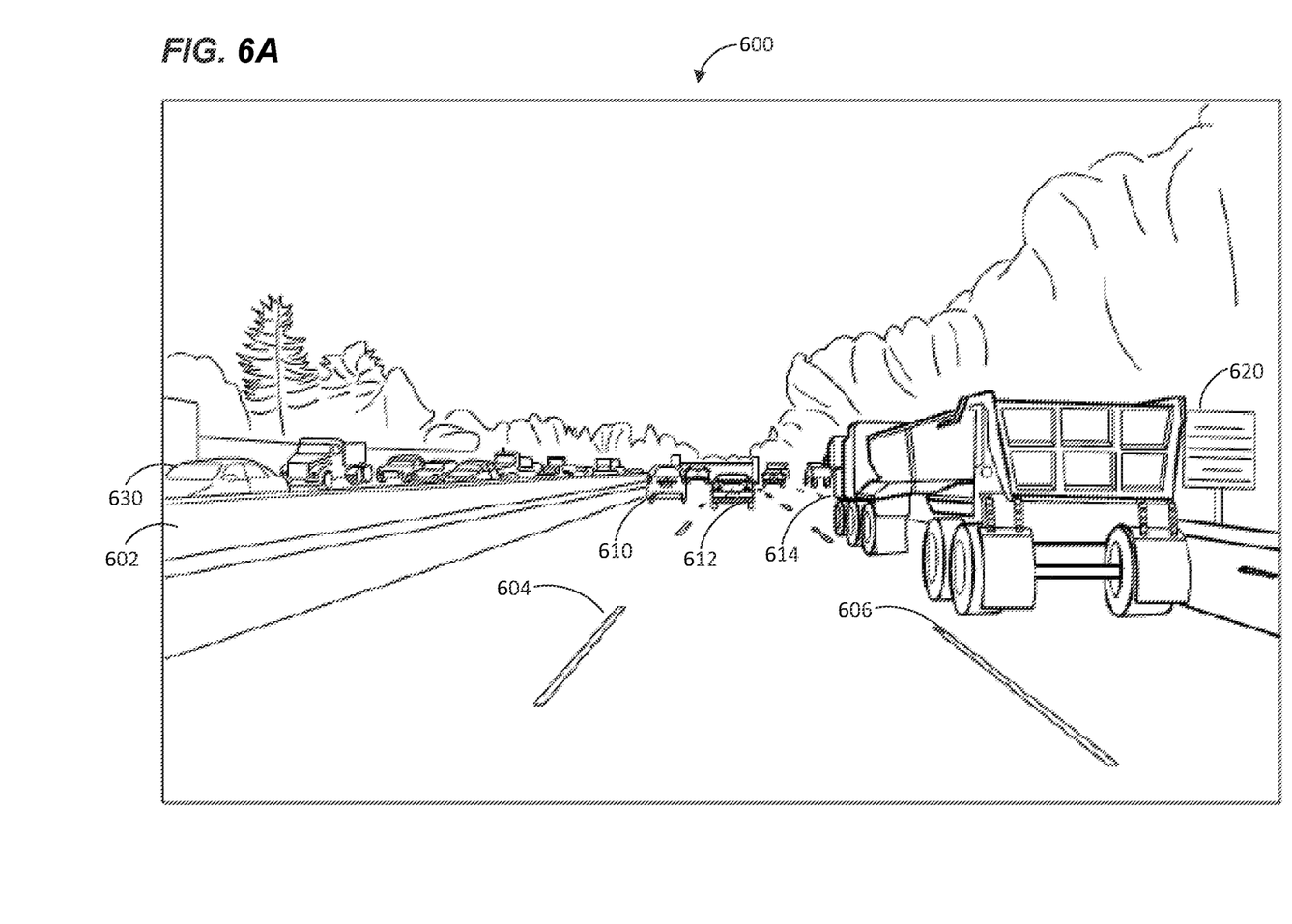
FIG. 6A illustrates an example photo-realistic scene of a real-world or virtual environment in which sensor data for training a perception machine learning model can be collected.

FIG. 6A illustrates an example scene 600 depicting multiple objects, which the training platform 102 can use to train the perception ML model 130. The scene 600 in some scenarios is a real-world environment in which a vehicle equipped with one or more sensors (e.g., the vehicle 300 of FIG. 3) can operate. The scene 600 in other scenarios is a photo-realistic scene generated in the virtual environment 108. In either case, the example scene 600 depicts the environment in the direction of travel of a vehicle along a highway.

As seen in FIG. 6A, the environment of the scene 600 can include various objects or surfaces, including a highway with a median wall 602 that divides two directions of traffic, with multiple lanes in each direction. For example, lane markings 604 and 606 divide three lanes of the highway in the direction of travel of the autonomous real-world vehicle or simulated vehicles. In addition, the environment of the scene 600 includes objects such as vehicles 610, 612, 614 moving within each of the lanes divided by lane markings 604 and 606. The environment also includes a vehicle 630 moving in an opposite direction. The scene 600 also includes other objects and/or surfaces, such as a highway sign 620.

In some implementations, the scene 600 is captured by the vehicle sensors 106 operating in respective real-world vehicles. In other implementations, the scene 600 is a photo-realistic scene that includes two-dimensional (2D) image that simulates a real-world scene as captured by a real-world 2D camera, a lidar, another sensor, or any suitable combination of sensors. Thus, the virtual environment, and its related objects and surfaces, of the scene 600 represent a real-world scene for purposes of generating training feature dataset(s) as described herein. When the scene 600 represents an image captured by 2D camera, the scene 600 may simulate a red-green-blue (RGB) image (e.g., having RGB pixels) as captured by a 2D camera or other sensor. For the same reasons, the photo-realistic scene 600 may simulate an image determined from a visible spectrum of light in a real-world environment (e.g., as represented by the virtual environment of photo-realistic scene 600).

The scene 600 of FIG. 6A can represent a single frame or image captured by the vehicle sensors 106, or as would be captured by a real-world camera. In certain embodiments, multiple images (e.g., frames) may be captured every second, such as at a 30-frames-per-second rate. An imaging engine implemented in one more servers can be configured to generate images, such as photo-realistic scene 600, in the same or similar capacity (e.g., 30-frames-per-second) in order to simulate the same or similar virtual environment as would be experienced by a real-world autonomous vehicle in a real-world environment. In this way, data or dataset(s) generated in the virtual environment 108 simulates real-world environments, and is therefore useful in the training of the perception model 130 or, more generally, self-driving architectures.

When the scene 600 includes a 2D image representing a photo-realistic scene, the 2D image may comprise 2D pixel data (e.g., RGB pixel data) that initially may be generated by an imaging engine (e.g., a gaming engine) as a 3D image. The 3D image may then be rasterized, converted, or otherwise transformed into a 2D image, e.g., having RGB pixel data. Such RGB pixel data may be used as training data for perception model 130. In addition, the 3D and/or 2D image may also be converted or otherwise transformed into point cloud data and/or simulated point cloud data.

Additionally or alternatively, imaging scenes generated, rendered or otherwise determined in the virtual environment 108 can correspond to multiple frames comprising a video. In some embodiments, the video may be rendered at a select number of frames per second (e.g., 30-frames-per-second). In additional embodiments, a video comprised of various frames may define an autonomous vehicle moving along a standard route within the virtual environment, where the standard route may be a predefined route. In some implementations, for example, the geometry of a certain standard route within a virtual environment, along with the corresponding values for lane markings, obstacles on the surface, surface quality, and other factors that affect sensor readings may define a ground truth route. In other words, the standard or ground truth route may be a predetermined route in a virtual environment used to generate baseline training data for the perception model 130. In some embodiments, this standard or ground truth route may be the same across multiple virtual vehicle trips within a virtual environment. In such embodiments, multiple simulated autonomous vehicles, equipped with respective sensors, may move along the standard route. The sensor simulator 140 in these implementations can generate simulated sensor data as the virtual vehicle may be observed and/or recorded as feature data for purposes of training machine learning models as described herein.

The training platform 102 can determine or predict how sensors in a virtual vehicle respond to various road conditions, weather conditions, road obstacles, etc. In an example scenario, the training platform 102 operates a virtual autonomous vehicle in accordance with a predetermined ground truth route, and the sensor simulator 140 generates simulated sensor outputs describing road conditions, lane data, distance to stationary and moving obstacles, and other parameters of the environment simulated for the ground truth route. In a reinforcement learning simulation (e.g., a simulation ran against a ground truth route 100 times), for example, the perception model 130 accurately sensing environmental parameters associated with the ground truth would cause the generation of a digital or electronic reward (e.g., incrementing an overall success rate based on the output of the virtual sensors). Based on the reward, the training module 132 may adjust to maximize reward/increase performance of predictions (e.g., update weights of the perception model 130 to correspond to a higher accuracy of measurement), so that the perception model 130 can sense the environment of the vehicle 300 more accurately. As a more specific example, the training module 132 can generate positive values when the perception model 130 interprets input from the virtual sensors of the sensor simulator 140 to make accurate classification decisions (e.g., "tree," "lane marking," "vehicle," "pedestrian," "highway divider"), generate distance measurements accurate to some measurable degree (e.g., "5.35 meters to the obstacle ahead"), generate sufficiently accurate readings of road and lane geometry, generate accurate measurements of weather conditions, etc. In some aspects, the standard route may be useful for implementing vote counters and the like.

In other embodiments, a video (e.g., multiple frames, images, scenes, etc. as described herein) may define an autonomous vehicle moving along an undetermined route within the virtual environment. In such embodiments, the undetermined route may be a randomized route. Such randomized route may have multiple different permutations (e.g., different environment characteristics, streets, or other objects or surfaces) for testing or verifying the perception model 130 in a virtual environment.

Figure 6B:
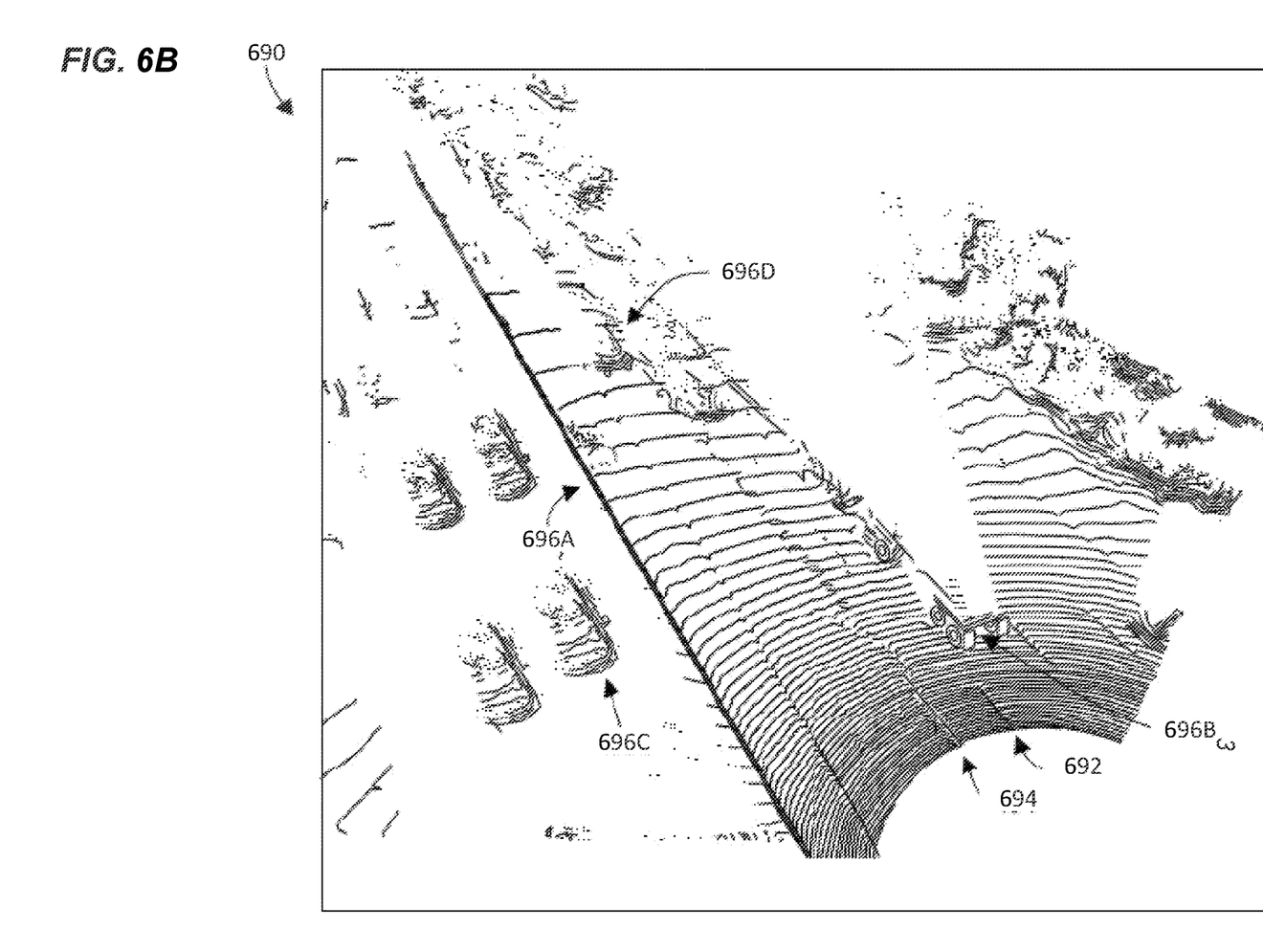
FIG. 6B illustrates an example point cloud that may be generated for the real-world or virtual environment of FIG. 6A using sensor data.

A point cloud representation 690 of the scene 600 is described next with reference to FIG. 6B. The point cloud 690 can correspond for example to an implementation in which two lidar devices operating in a vehicle each capture a roughly 60-degree horizontal field of regard, and in which the two fields of regard have a small overlap 694 (e.g., two or three degrees of overlap). The point cloud 690 may have been generated using the sensor heads 308A and 308D of the vehicle 300 of FIG. 3. In general, the sensor heads used to generate the point cloud 690 can be either virtual sensors operating in the virtual environment 108 or real-world sensor heads operating in vehicles in a real-world environment. Further, while depicted as a visual image in FIG. 6B, in some embodiments, the point cloud 690 is not actually rendered or displayed at any time. Instead, point cloud 690 may comprise data saved in a database or memory, such as memory 122, or elsewhere as described herein. As seen in FIG. 6B, the point cloud 690 depicts a ground plane 692 (here, the road surface) as a number of substantially continuous scan lines, and also depicts, above the ground plane 692, a number of objects 696 (e.g., vehicles 696A-D). For clarity, only a small number of the objects shown in FIG. 6B are labeled with a reference number.

Figure 7:
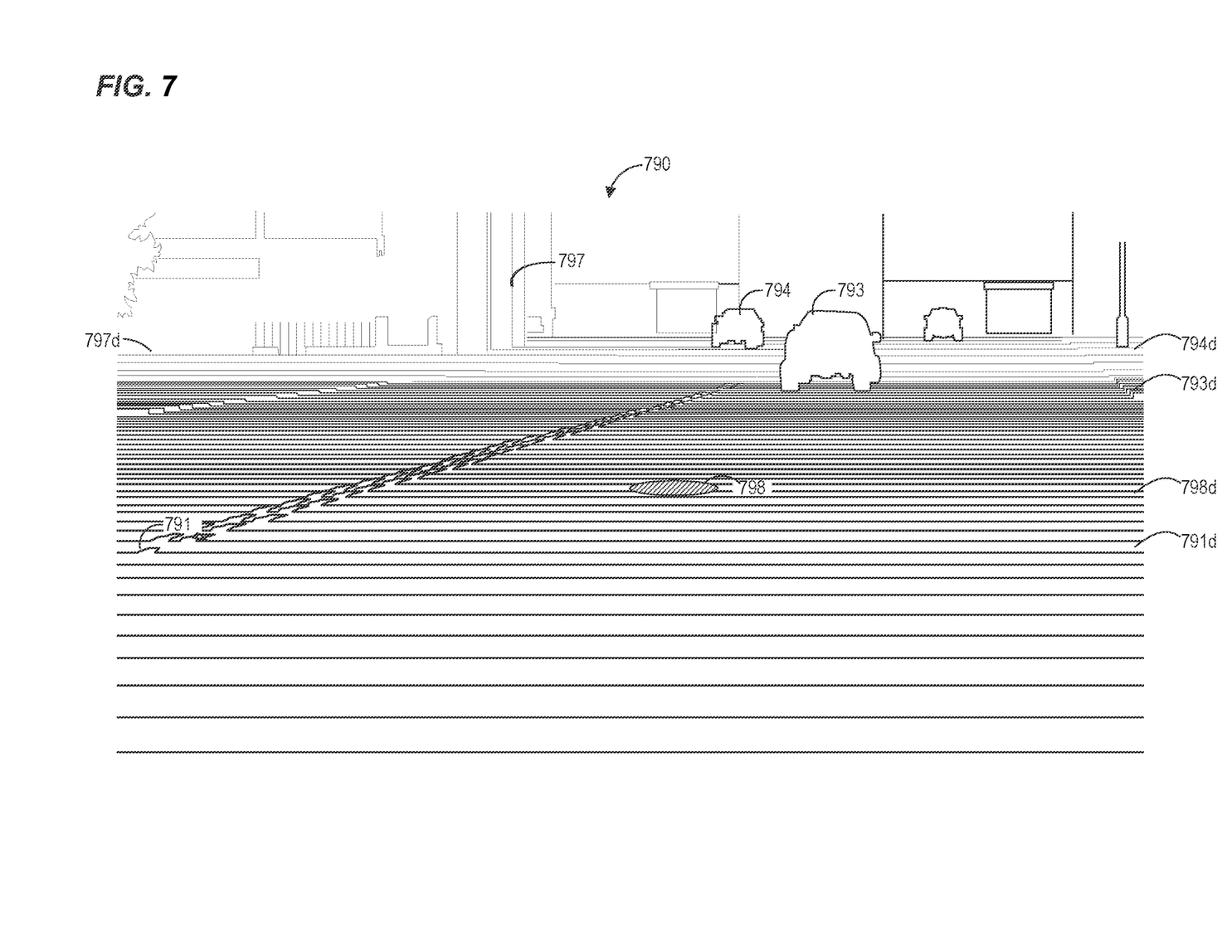
FIG. 7 illustrates an example depth-map-realistic scene of a real-world or virtual environment, for which a perception machine learning model can generate parameters.

Imaging scenes generated by the training platform 102 also may include depth-map-realistic scenes, such depth-map-realistic scene 790 as illustrated by FIG. 7. The depth-map-realistic scene 790 may be rendered by a shader of a game engine implemented in the training platform 102, for example. In some embodiments, the shader may be a replacement shader, which may increase the efficiency and/or speed of rendering depth-map-realistic scenes in general (e.g., such as depth-map-realistic scene 790). Generally speaking, depth-map-realistic scenes may be rendered in multiple bit colors (e.g., 16-bit) for a variety of RGB pixel spectrums.

With continued reference to FIG. 7, one or more pixels (e.g., color/RGB pixels) of the depth-map-realistic scene 790 may be associated with one or more corresponding depths (e.g., virtual distances) of objects or surfaces within depth-map-realistic scene 790. The depth-map-realistic scene 790 is depicted from the perspective of a virtual autonomous vehicle. In such embodiments, color/RGB pixels may indicate how close or far a particular object or surface is from the point of reference (e.g., from the viewpoint of a virtual vehicle) of the scene as rendered. For example, pixels at distance 791*d* may represent a certain distance within depth-map-realistic scene 790. As depicted, pixels at distance 791*d* span across depth-map-realistic scene 790 in a horizontal fashion simulating or mimicking scan lines, readings, or otherwise signals of a lidar-based system. In the embodiment of FIG. 7, pixels at distance 791*d* indicate the distance of a portion of a center lane marking 791 to the autonomous vehicle. Similarly, pixels at distance 798*d* indicate the distance of a pothole 798 in the road along which the autonomous vehicle is traveling. In still further examples, pixels at distance 793*d* and pixels at distance 794*d* indicate the respective distances of vehicle 793 and vehicle 794 as each detected by the lidar system of the autonomous vehicle. Similarly, pixels at distance 797*d* indicate the distance of the base of building 797 as detected by the lidar system of the autonomous vehicle. Thus, each pixel in depth-map-realistic scene 790 may represent a particular distance or depth as would be experienced by a real-world camera or other sensor, such as a lidar device. As described, in virtual environments, the distance or depth into a scene or image (e.g., depth-map-realistic scene 790) is represented by each of the pixels (depth). The different color/RGB pixels at different vertical heights in the depth-map-realistic scene 790 may represent or simulate point cloud data and/or depth maps as used in real-world applications or environments.

In other embodiments, one or more color or RGB pixels of a depth-map-realistic scene (e.g., depth-map-realistic scene 790) may be associated with one or more corresponding simulated intensity values. In such embodiments, the intensity values may represent of one or more virtual or real-world lidar sensors.

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method for generating a machine learning model for controlling autonomous vehicles, the method comprising:
   obtaining, by processing hardware, first training sensor data from a plurality of real-world sensors associated with one or more training vehicles, the first training sensor data being indicative of physical conditions of an environment in which the one or more training vehicles operate;
   obtaining, by the processing hardware, second training sensor data from a plurality of virtual sensors, the second training sensor data being indicative of simulated physical conditions of a virtual environment; and training, by the processing hardware, a machine learning (ML) model using both real-world and virtual training datasets including the first training sensor data, the second training sensor data, and respective sensor setting parameters of the plurality of real-world sensors associated with the one or more training vehicles and the plurality of virtual sensors, the ML model being trained for generating physical environment parameters in response to input of real-world sensor output data and associated real-world sensor setting parameters, wherein the real-world and virtual training datasets used to train the ML model include indications of which subsets of sensor data correspond to which of the respective sensor parameter settings including one or more of the following: different scan line distributions or different exposure settings;

wherein a controller in an autonomous vehicle (i) receives new sensor data from one or more sensors operating in the autonomous vehicle, (ii) receives respective current setting parameters from the one or more sensors of the autonomous vehicle, (iii) applies the received new sensor data and the received respective current sensor setting parameters to the ML model to generate current parameters of a current environment in which the autonomous vehicle operates, (iv) provides the generated current parameters to a motion planner component to generate decisions for controlling the autonomous vehicle, and (v) causes the autonomous vehicle to maneuver in accordance with the generated decisions.

2. The method of claim 1, wherein training the ML model includes:
receiving, from a database, map data for a geographic region in which the one or more training vehicles operate, the map data indicating road geometry,
comparing, by the processing hardware, mapping parameters included in the physical environment parameters generated by the ML model to the map data received from the database to generate an error signal, and
applying, by the processing hardware, the error signal to the ML model as an additional input.

3. The method of claim 1, wherein training the ML model includes:
receiving, from a database, indications of locations of objects of a certain type in a geographic region in which the one or more training vehicles operate,
applying, by the processing hardware, the indications to the ML model as a cost function.

4. The method of claim 3, wherein the objects of the certain type include traffic lights.

5. The method of claim 1, wherein obtaining the first training sensor data includes obtaining, from each of the one or more training vehicles, lidar data generated by one or more respective lidar systems.

6. The method of claim 1, wherein obtaining the first training sensor data includes obtaining, from each of the one or more training vehicles, camera data generated by one or more respective cameras operating in a visible range and/or an infrared range.

7. The method of claim 1, wherein obtaining the first training sensor data includes obtaining, from each of the one or more training vehicles, radar data generated by one or more respective radar systems.

8. The method of claim 1, wherein training the ML model includes training the ML model using weather data indicative of current weather conditions in the environment in which the one or more training vehicles operate.

9. The method of claim 1, wherein training the ML model includes training the ML model for generating respective confidence scores for the physical environment parameters.

10. The method of claim 1, wherein training the ML model includes training the ML model for generating the physical environment parameters including an indication of a curvature of a road on which the autonomous vehicle travels.

11. The method of claim 1, wherein training the ML model includes training the ML model to for generating the physical environment parameters including an indication of lane markings on a road on which the autonomous vehicle travels.

12. The method of claim 1, wherein training the ML model includes training the ML model for generating the physical environment parameters including an indication of road boundaries on a road on which the autonomous vehicle travels.

13. The method of claim 1, wherein training the ML model includes training the ML model for generating the physical environment parameters including a distance from the autonomous vehicle to an obstacle on a road on which the autonomous vehicle travels.

14. The method of claim 1, wherein training the ML model incudes training at least one of a deep neural network or a convolutional neural network.

15. A computing system comprising:
processing hardware; and
a non-transitory computer-readable memory storing thereon instructions which, when executed by the processing hardware, cause the computing system to:
obtain first training sensor data from a plurality of real-world sensors associated with one or more training vehicles, the first training sensor data being indicative of physical conditions of an environment in which the one or more training vehicles operate,
obtain second training sensor data from a plurality of virtual sensors, the second training sensor data being indicative of simulated physical conditions of a virtual environment, and
train a machine learning (ML) model using both real-world and virtual training datasets including the first training sensor data, the second training sensor data, and respective sensor setting parameters of the plurality of real-world sensors associated with the one or more training vehicles and the plurality of virtual sensors, the ML model being trained for generating physical environment parameters in response to input of real-world sensor output data and associated real-world sensor setting parameters, wherein the real-world and virtual training datasets used to train the ML model include indications of which subsets of sensor data correspond to which of the respective sensor parameter settings including one or more of the following: different scan line distributions or different exposure settings;
wherein a controller in an autonomous vehicle (i) receives new sensor data from one or more sensors operating in the autonomous vehicle, (ii) receives respective current sensor setting parameters from the one or more sensors of the autonomous vehicle, (iii) applies the received new sensor data and the received respective current sensor setting parameters to the ML model to generate current parameters of a current environment in which the autonomous vehicle operates, (iv) provides the generated current parameters to a motion planner component to generate decisions for controlling the autonomous vehicle, and (v) causes the autonomous vehicle to maneuver in accordance with the generated decisions.

16. The computing system of claim 15, wherein to train the ML model, the instructions cause the computing system to:
receive, from a database, map data for a geographic region in which the one or more training vehicles operate, the map data indicating road geometry,
compare mapping parameters included in the parameters generated by the ML model to the map data received from the database to generate an error signal, and
apply the error signal to the ML model as an additional input.

17. The computing system of claim 15, wherein to train the ML model, the instructions cause the computing system to:
receive, from a database, indications of locations of objects of a certain type in a geographic region in which the one or more training vehicles operate,
apply the indications to the ML model as a cost function.

18. The computing system of claim 17, wherein the objects of the certain type include traffic lights.

19. A controller operating in an autonomous vehicle, the controller comprising:
one or more processing units; and
a non-transitory computer-readable memory storing thereon:
a machine-learning (ML) model configured to generate physical environment parameters, in response to input of real-world sensor output data and associated real-world sensor setting parameters, wherein the ML model is trained with both real-world and virtual training datasets including first training sensor data from a plurality of real-world sensors associated with one or more training vehicles, second training sensor data from a plurality of virtual sensors, and respective sensor setting parameters of the plurality of real-world sensors and the plurality of virtual sensors, wherein the real-world and virtual training datasets used to train the ML model include indications of which subsets of sensor data correspond to which of the respective sensor parameter settings including one or more of the following: different scan line distributions or different exposure settings,
first instructions that implement a perception module configured to (i) receive new sensor data from one or more sensors operating in the autonomous vehicle, in real time, (ii) receive respective current sensor setting parameters, in real time, and (iii) apply the received new sensor data and the respective current sensor setting parameters to the ML model to generate current parameters of an environment in which the autonomous vehicle operates, and
second instructions that implement a motion planner configured to (i) receive the generated current parameters from the perception module, and (ii) generate decisions for controlling the autonomous vehicle based on the generated current parameters;
wherein the controller causes the autonomous vehicle to maneuver in accordance with the generated decisions.

20. An autonomous vehicle comprising:
vehicle maneuvering components to effectuate at least steering, acceleration, and braking of the autonomous vehicle;
one or more sensors configured to generate signals indicative of physical conditions of an environment in which the autonomous vehicle operates; and
a controller configured to (i) receive the signals from the one or more sensors, (ii) receive respective current sensor setting parameters from the one or more sensors, (iii) apply the received signals and the received respective current sensor setting parameters to a machine learning (ML) model to generate, in real time, current parameters of an environment in which the autonomous vehicle operates, (iv) apply the generated current parameters of the environment to a motion planner to generate decisions for controlling the autonomous vehicle, and (v) control the vehicle maneuvering components in accordance with the generated decisions,
wherein the ML model for generating physical environment parameters in response to input of real-world sensor output data and associated real-world sensor setting parameters is trained with both real-world and virtual training datasets including first training sensor data from a plurality of real-world sensors associated with one or more training vehicles, second training sensor data from a plurality of virtual sensors, and respective sensor setting parameters of the plurality of real-world sensors associated with the one or more training vehicles and the plurality of virtual sensors, wherein the real-world and virtual training datasets used to train the ML model include indications of which subsets of sensor data correspond to which of the respective sensor parameter settings including one or more of the following: different scan line distributions or different exposure settings.

* * * * *